April 13, 1937.  G. SJOLANDER  2,077,275
COMBINED BUMPER AND JACK
Filed Aug. 19, 1936  2 Sheets-Sheet 1

Gustaf Sjolander, INVENTOR
BY Victor J. Evans & Co.
ATTORNEYS

April 13, 1937.  G. SJOLANDER  2,077,275
COMBINED BUMPER AND JACK
Filed Aug. 19, 1936   2 Sheets-Sheet 2
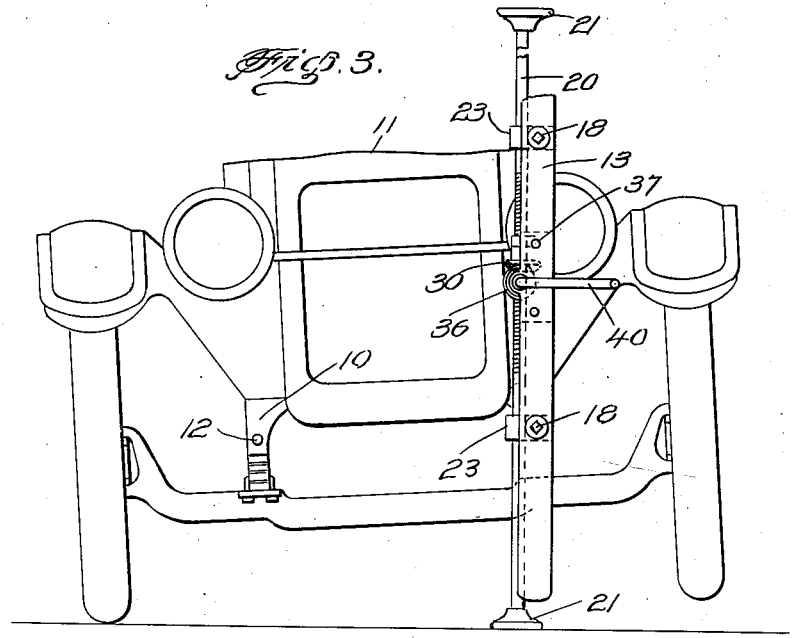
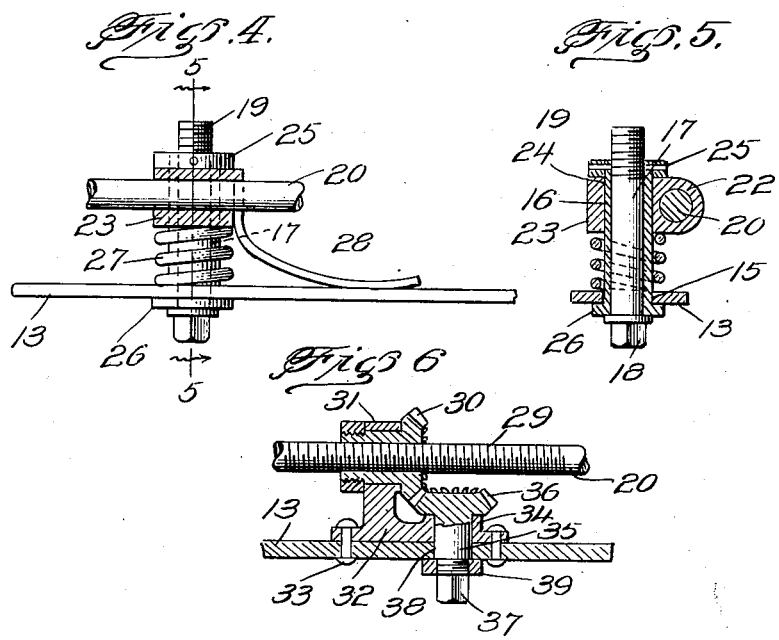
Gustaf Sjolander, INVENTOR
BY Victor J. Evans & Co.
ATTORNEYS Patented Apr. 13, 1937

2,077,275

UNITED STATES PATENT OFFICE 2,077,275

COMBINED BUMPER AND JACK

Gustaf Sjolander, Midland, Mich.

Application August 19, 1936, Serial No. 96,888

3 Claims. (Cl. 293—55)

This invention relates to combined bumper and jacks for motor vehicles and has for an object to provide a bumper and a lifting jack in a unitary assembly adapted to be associated with the vehicle frame to be used horizontally as a bumper and adapted to be rocked to the vertical on either side of the frame for use as a jack.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 3 is a view similar to Figure 1 but showing the device in position for use as a jack.

Figure 4 is a detail sectional view showing the bolt for rigidly and pivotally mounting the bumper and jack on the vehicle frame.

Figure 5 is a cross sectional view taken on the line 5—5 of Figure 4.

Figure 6 is a detail longitudinal sectional view of the means for actuating the jack.

Figure 1:
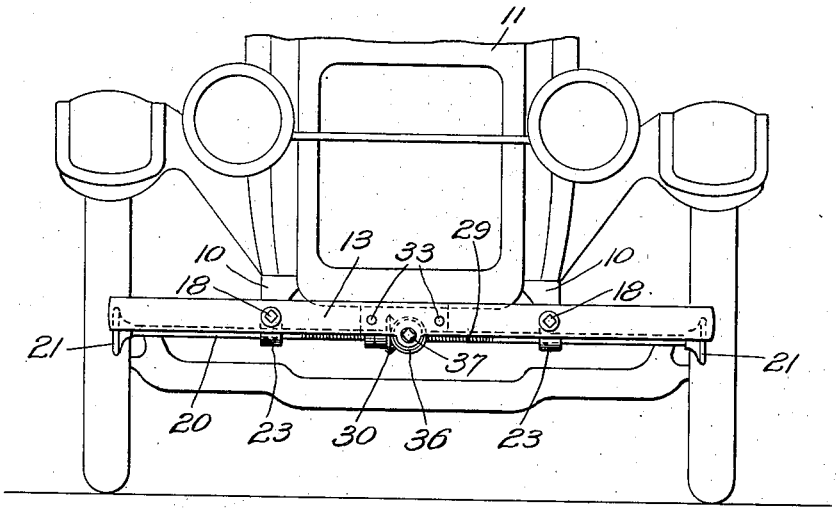
Figure 1 is a front elevation of a combined bumper and jack constructed in accordance with the invention and shown in applied position.
Figure 2:
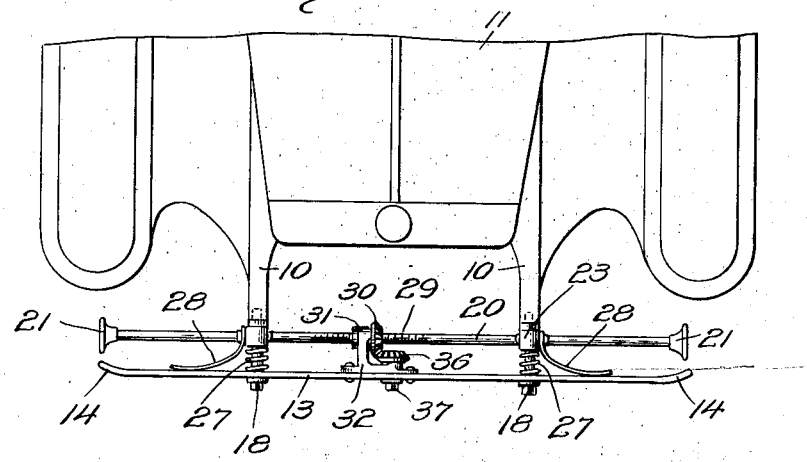
Figure 2 is a plan view of the parts shown in Figure 1.

Referring now to the drawings in which like characters of reference designate similar parts in the various views, 10 designates the front ends of the longitudinal sills or frame bars of a motor vehicle 11, these bars being provided at the front ends with screw threaded openings 12 for mounting the combined bumper and jack comprising the subject matter of the invention.

The bumper 13 is in the nature of a flat bar having the ends 14 curved rearwardly, the bar being provided intermediate the ends with openings 15, one of which is shown in Figure 5, to receive sleeves 16 through each of which a bolt 17 is passed, the same having a wrench head 18 on one end and having the other end screw threaded as shown at 19 for engagement in the associated threaded opening 12 in one of the frame bars, for attaching the bumper to the vehicle in horizontal position as best shown in Figure 1.

The jack 20 is in the form of a rod of substantially the same length as the bumper and having the ends equipped with flared feet 21 adapted to rest upon the ground when the jack is in use to elevate either one of the front wheels, or rear wheels as will presently be described. The jack slidably fits in openings 22 formed in blocks 23 which are provided with respective openings 24 to snugly receive the above mentioned sleeve 16. The sleeve is provided with a collar 25 on the inner end which bears against the block and is also provided with a collar 26 on the outer end which bears against the bumper 13, as shown in Figures 4 and 5.

A helical spring 27 is confined under compression on the sleeve between the block and the bumper and tends constantly to spread the bumper and the block apart to prevent rattling. An arcuate leaf spring 28 is secured to each block and bears with its free end against the inner face of the bumper and also tends constantly to hold the block and the bumper spread apart to prevent rattling.

The jack is provided centrally with a screw thread 29 which meshes with an internally threaded bevel gear 30 carried by the bearing 31 on an L-shaped bracket 32 which is bolted, riveted, or otherwise secured to the bumper as shown at 33 and which is provided with a bearing 34 which receives a shaft 35. The shaft is equipped at the inner end with a bevel gear 36 which meshes with the bevel gear 30 and is equipped at the outer end with wrench faces 37. The shaft passes loosely through an opening 38 in the bumper 13 and is equipped with a collar 39 which bears upon the outer face of the bumper and holds the shaft and bevel gear assembled in the bearing 34.

In operation, either of the bolts 17 may be backed out by applying thereto the same wrench 40 that is used to loosen the rim bolts of the wheels. Thereupon the unitary assembly of bumper and jack may be rocked upon the other bolt 17 as a pivot to the position shown in Figure 3. The wrench 40 may now be applied to the wrench faces 37 of the shaft 35 and rotated in a direction to feed the jack 29 through the bevel gear 30 and elevate the wheels of the vehicle to permit removal thereof in the customary manner. After repairs to the wheel have been made the wrench may be rotated in the opposite direction to feed the jack upwardly through the bevel gear 30 and lower the wheel to the ground in the usual manner. The bumper and jack may be now rocked to the horizontal position and secured in place by advancing the first mentioned screw 17 into the corresponding threaded opening 12 in the frame bar.

From the above description it is thought that the construction and operation of the invention will be fully understood without further explanation.

What is claimed is:

1. In combination, a motor vehicle bumper, a lifting jack extending longitudinally of the bumper, means for rigidly and pivotally mounting the bumper and jack upon a vehicle frame, said jack being in the nature of a rod having terminal feet, a bracket on the bumper, meshing bevel gears carried by the bracket, one of the gears having a screw thread connection with the jack, a shaft for the other gear terminating in wrench faces, and anti-rattling means between the bumper and the jack.

2. A combined bumper and jack comprising a flat bar, there being spaced openings in the bar, sleeves in the openings, bolts in the sleeves having wrench heads, said bolts being adapted to be threaded into openings formed for the reception thereof in a vehicle frame, a jack in the form of a rod of substantially the same length as the bumper and having the ends equipped with feet adapted to rest upon the ground, blocks snugly receiving said sleeves and receiving the jacks for sliding movement endwise with respect to the bumper, and gear operated feed screw means for sliding the jack to operative or to released position.

3. A combined bumper and jack comprising a bar, sleeves carried by the bar, attaching bolts in the sleeves, said bolts being adapted to individually form a pivot on which the bumper may be swung in a vertical plane, a jack, blocks carried by said sleeves and slidably receiving the bumper, anti-rattling springs between the blocks and the bumper, and gear operated feed screw means for moving the jack lengthwise of the bar.

GUSTAF SJOLANDER.